(12) United States Patent
Wang

(10) Patent No.: US 12,124,693 B2
(45) Date of Patent: Oct. 22, 2024

(54) ELECTRONIC WHITEBOARD SYSTEM AND OPERATION METHOD THEREOF

(71) Applicant: Optoma Corporation, New Taipei (TW)

(72) Inventor: Wen-Tai Wang, New Taipei (TW)

(73) Assignee: Optoma Corporation, New Taipei (TW)

( * ) Notice: Subject to any disclaimer, the term of this patent is extended or adjusted under 35 U.S.C. 154(b) by 0 days.

(21) Appl. No.: 17/976,889

(22) Filed: Oct. 31, 2022

(65) Prior Publication Data

US 2024/0143158 A1    May 2, 2024

(51) Int. Cl.
*G06F 3/04883* (2022.01)
*G06F 3/0354* (2013.01)

(52) U.S. Cl.
CPC ...... *G06F 3/04883* (2013.01); *G06F 3/03543* (2013.01); *G06F 3/03545* (2013.01)

(58) Field of Classification Search
CPC ... H04L 12/18; G06F 3/1454; G06F 3/04883; G06F 3/03543; G06F 3/03545; G06T 11/203; G06V 30/32; G06V 30/333; G06V 30/347
See application file for complete search history.

(56) References Cited

U.S. PATENT DOCUMENTS

| | | | |
|---|---|---|---|
| 2006/0078203 A1 | 4/2006 | Loeb | |
| 2011/0298807 A1* | 12/2011 | Kim | G06F 3/04883 345/442 |
| 2014/0380193 A1* | 12/2014 | Coplen | G06F 3/04847 715/753 |
| 2015/0081291 A1* | 3/2015 | Jeon | G06F 3/0482 704/235 |
| 2015/0205398 A1* | 7/2015 | Le | G06F 3/017 345/173 |
| 2020/0356254 A1* | 11/2020 | Missig | G06F 3/0485 |
| 2021/0357113 A1* | 11/2021 | Mangu | G06T 9/20 |
| 2022/0365670 A1* | 11/2022 | Jia | G06V 30/287 |
| 2023/0385523 A1* | 11/2023 | Chen | G06F 40/103 |

FOREIGN PATENT DOCUMENTS

| | | |
|---|---|---|
| CN | 102044173 | 5/2011 |
| CN | 113487695 | 10/2021 |
| CN | 114690967 | 7/2022 |
| TW | 201214329 | 4/2012 |

* cited by examiner

*Primary Examiner* — Temesghen Ghebretinsae
*Assistant Examiner* — Ivelisse Martinez Quiles
(74) *Attorney, Agent, or Firm* — JCIPRNET

(57) ABSTRACT

An electronic whiteboard system and an operation method are provided. The electronic whiteboard system includes an electronic device. The electronic device includes a whiteboard module. The whiteboard module performs a writing operation. The whiteboard module determines whether a writing track of the writing operation is a straight track or a curved track, and adjust the writing track to an adjusted writing track according to a corresponding parametric curve, and generate a writing message according to the adjusted writing track.

15 Claims, 5 Drawing Sheets

ELECTRONIC WHITEBOARD SYSTEM AND OPERATION METHOD THEREOF

BACKGROUND

Technical Field

The invention relates to a system, in particular, to an electronic whiteboard system and an operation method thereof.

Description of Related Art

In general, when a user writes on the cloud electronic whiteboard, the user may use a mouse or a stylus to simulate the writing action of the pen to write on the cloud electronic whiteboard. However, because it is difficult to control the mouse or the stylus to draw lines or write texts (i.e. words or characters), the lines or texts written by the mouse or the stylus are of poor quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an electronic whiteboard system and an operation method thereof, which can provide a writing function of a cloud electronic whiteboard.

Other objects and advantages of the invention may be further illustrated by the technical features broadly embodied and described as follows.

In order to achieve one or a portion of or all of the objects or other objects, an embodiment of the invention provides an electronic whiteboard system. The electronic whiteboard system includes an electronic device. The electronic device includes a whiteboard module. The whiteboard module is configured to perform a writing operation. The whiteboard module is configured to determine whether a writing track of the writing operation is a straight track or a curved track, and adjust the writing track to an adjusted writing track according to a corresponding parametric curve, and generate a writing message according to the adjusted writing track.

In the embodiment of the invention, the whiteboard module is configured to judge whether at least one of a writing direction and a track angle of the writing track is changed to determine the writing track of the writing operation is the straight track or the curved track.

In the embodiment of the invention, when the whiteboard module determines that the writing track of the writing operation is the straight track, the whiteboard module is configured to adjust the writing track according to a first-order Bezier curve.

In the embodiment of the invention, when the whiteboard module determines that the writing track of the writing operation is the curved track, the whiteboard module is configured to adjust the writing track according to a second-order Bezier curve.

In the embodiment of the invention, the whiteboard module is configured to generate a first coordinate point and a second coordinate point corresponding to the writing track. The adjusted writing track is determined by a start coordinate point, the first coordinate point and the second coordinate point.

In the embodiment of the invention, the whiteboard module is configured to execute a write adjustment mode of the writing operation according to an operation command, so as to determine whether to adjust the writing track.

In the embodiment of the invention, the whiteboard module comprises a floating board, the floating board is configured to generate the operation command.

In the embodiment of the invention, the whiteboard module is further configured to generate a writing format suggestion information for a current text object according to a size of a pervious text object.

In the embodiment of the invention, the electronic device further comprises an input module, the input module is connected to the whiteboard module and configured to generate the writing track, and the input module comprises at least one of a mouse and a stylus.

In order to achieve one or a portion of or all of the objects or other objects, an embodiment of the invention provides an operation method of an electronic whiteboard system. The operation method of an electronic whiteboard system includes the following steps: performing a writing operation by a whiteboard module; determining whether a writing track of the writing operation is a straight track or a curved track, adjusting the writing track to an adjusted writing track according to a corresponding parametric curve; and generating a writing message according to the adjusted writing track.

In the embodiment of the invention, the step of determining whether the writing track of the writing operation is the straight track or the curved track includes: judging whether at least one of a writing direction and a track angle of the writing track is changed to determine the writing track of the writing operation is the straight track or the curved track.

In the embodiment of the invention, the step of adjusting the writing track to the adjusted writing track includes: when the whiteboard module determines that the writing track of the writing operation is the straight track, adjusting the writing track according to a first-order Bezier curve.

In the embodiment of the invention, the step of adjusting the writing track includes: when the whiteboard module determines that the writing track of the writing operation is the curved track, adjusting the writing track according to a second-order Bezier curve.

In the embodiment of the invention, the step of adjusting the writing track according to the second-order Bezier curve includes: generating a first coordinate point and a second coordinate point corresponding to the writing track. The adjusted writing track is determined by a start coordinate point, the first coordinate point and the second coordinate point.

In the embodiment of the invention, the step of executing the whiteboard module includes: executing a write adjustment mode of the writing operation according to an operation command, so as to determine whether to adjust the writing track.

In the embodiment of the invention, the operation method further includes the step: generating a writing format suggestion information for a current text object according to a size of a pervious text object.

Based on the above description, the electronic whiteboard system and the operation method thereof of the invention may execute the write adjustment mode in the writing operation to adjust the writing track, so as to generate the adjusted writing track with smooth writing effect on the cloud electronic whiteboard.

To make the aforementioned more comprehensible, several embodiments accompanied with drawings are described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
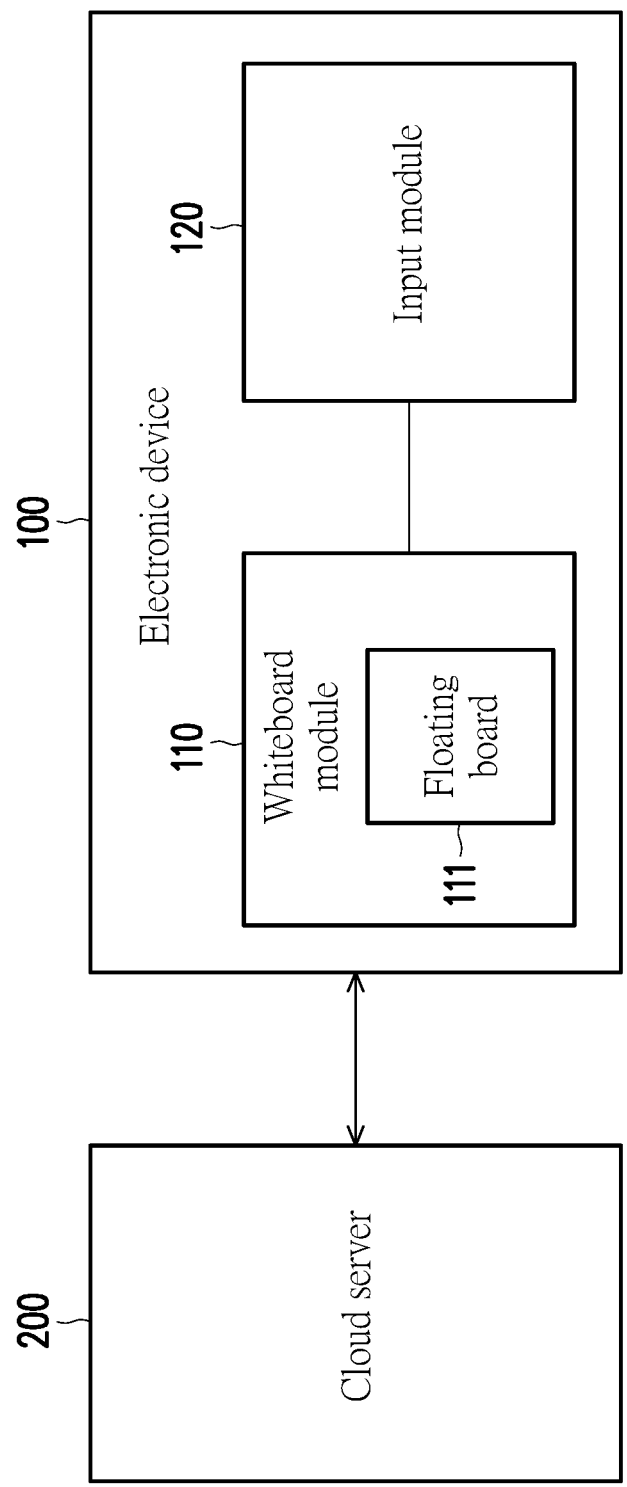
FIG. 1 is a schematic diagram of an electronic whiteboard system according to an embodiment of the invention.

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The above and other technical contents, features, and effects of the invention will be clearly presented in the following detailed description of a preferred embodiment with reference to the accompanying drawings. Directional terminology, such as "top," "bottom," "left," "right," "front," "back," etc., mentioned in the following embodiments is used with reference to the orientation of the Figure(s) being described and are not intended to be limiting of the invention.

In order to make the content of the invention more comprehensible, the following embodiments are specifically cited as examples on which the invention may indeed be implemented. In addition, wherever possible, elements/components/steps with the same reference numbers in the drawings and embodiments represent the same or similar components.

FIG. 1 is a schematic diagram of an electronic whiteboard system according to an embodiment of the invention. Referring to FIG. 1, the electronic whiteboard system 10 includes an electronic device 100. The electronic device 100 includes a whiteboard module 110 and an input module 120. The whiteboard module 110 includes a floating board 111, and the floating board 111 may be a function menu. The function menu may include icons corresponding to the functions that the user may operate. In the embodiment of the invention, the electronic device 100 may be an interactive flat panel (IFP), an electronic whiteboard with networking capability, a personal computer (PC), a tablet computer, a smart phone or similar electronic device, respectively, and may also include, for example, a processor, a storage device, a display device and a communication interface. The whiteboard module 110 is connected to the input module 120. The whiteboard module 110 may be configured to execute a whiteboard web program to perform a cloud electronic whiteboard, and the whiteboard module 110 may execute the floating board 111 on a whiteboard web, so that the user may execute a write adjustment mode of a writing operation on cloud electronic whiteboard through operating the floating board 111 by the input module 120. The floating board 111 may correspondingly generate an operation command of the writing operation. The input module 120 includes at least one of a mouse and a stylus, and the input module 120 is configured to generate a writing track according to the operation of the input module 120 by controlling of the user.

In the embodiment of the invention, in a process of the writing operation, the user may operate the input module 120 to write on the cloud electronic whiteboard, and the whiteboard module 110 may determine whether the writing track of the writing operation is a straight track or a curved track, and adjust the writing track to an adjusted writing track according to a corresponding parametric curve, and generate a writing message according to the adjusted writing track. The writing message may be displayed on the electronic device 100 and transmitted to the cloud server 200. Therefore, the electronic device 100 may automatically adjust the writing track to display the writing content with smooth writing effect on the cloud electronic whiteboard.

In the embodiment of the invention, the electronic device 100 may further includes a processor and a storage device. The processor is coupled to the storage device. The processor may include, for example, a central processing unit (CPU) having an image data processing function, or other programmable general-purpose or special-purpose microprocessors, an image processing units (IPU), a graphics processing unit (GPU), a digital signal processor (DSP), an application specific integrated circuits (ASIC), a programmable logic device (PLD), other similar arithmetic circuits, or a combination of these circuits. The storage device may include, for example, a non-volatile memory. The storage device may store the programs and algorithms of the whiteboard module 110 for the processor to read and execute the programs and algorithms of the whiteboard module 110, so as to realize the writing operation or the related operations, processes and functions of the cloud electronic whiteboard of the present invention.

In the embodiment of the invention, the electronic device 100 may further include a communication interface (or a data transmission module), and the electronic device 100 may be connected to the Internet or other network systems through the communication interface, so as to further connect to the cloud server 200. The communication interface is an interface capable of connecting the Internet, such as a circuit or a device connecting to the Internet by wireless (Wi-Fi device) or cable. In one embodiment of the invention, the electronic device 100 may further include a signal conversion module (not shown in figure), and the signal conversion module may be configured to receive and convert user's operation signal generated by editing on the cloud electronic whiteboard.

In the embodiment of the invention, the electronic whiteboard system 10 may be a multi-user collaboration system. The electronic whiteboard system 10 may be connected to a plurality of electronic devices, and the electronic devices may be operated by multiple users, respectively. The electronic devices may be implemented as electronic device 100 of FIG. 1, respectively. The cloud server 200 may be configured to provide a cloud electronic whiteboard function. The cloud server 200 may be disposed in the company capable of providing the service. The users may respectively execute the whiteboard web program on each of the electronic devices to perform related editing operations on the cloud electronic whiteboard. In one embodiment of the invention, the cloud server 200 may be configured as a collaboration hub to collect a plurality of edit information provided by the users performing collaborative editing of the cloud electronic whiteboard on the electronic devices, respectively. The cloud server 200 may process the edit information, so that the web application programs respectively executed by the electronic devices may display the collaborative editing result of the cloud electronic whiteboard. The cloud electronic whiteboard means that the users may display the image and related application tools (such as brushes, colors, etc.) like a physical electronic whiteboard on the electronic device 100 through the web application, and the users may perform actions such as drawing, moving objects or sharing files on the image of the electronic device 100. The users may jointly edit on a common virtual whiteboard, and the users may view the same image of the cloud electronic whiteboard through the electronic devices.

Figure 2:
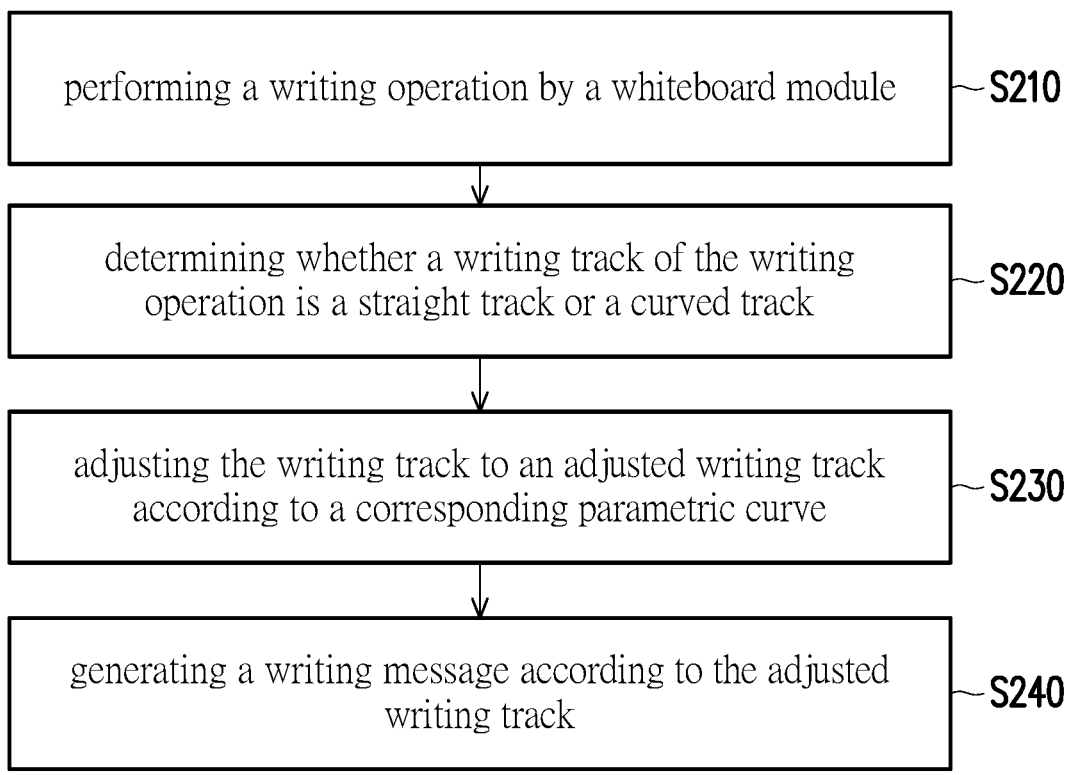
FIG. 2 is a flowchart of an operation method of the electronic whiteboard system according to an embodiment of the invention.
Figure 3:
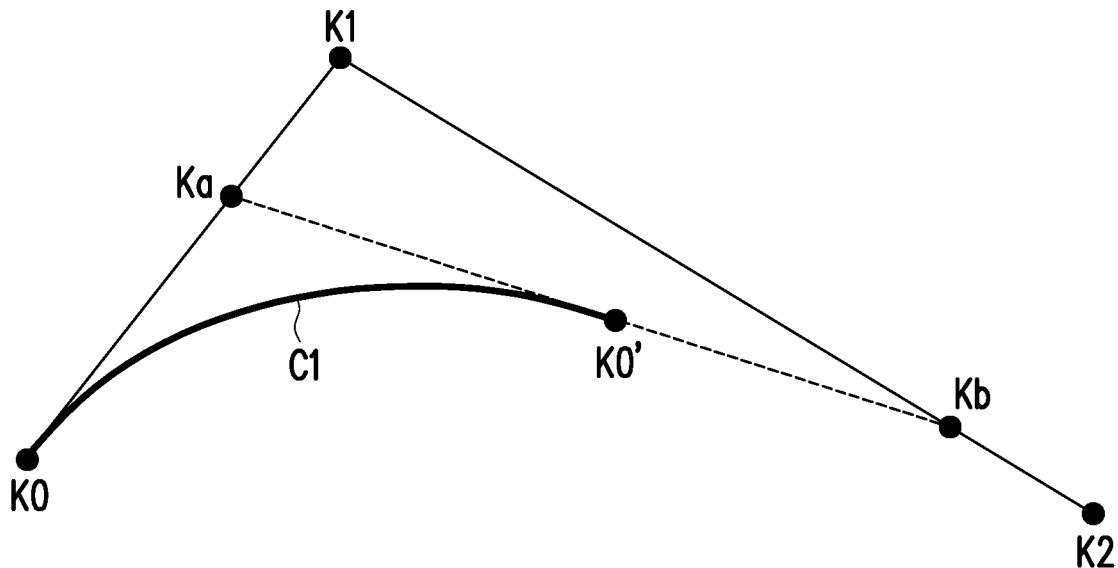
FIG. 3 is a schematic diagram of an adjusted writing track according to an embodiment of the invention.

FIG. 2 is a flowchart of an operation method of the electronic whiteboard system according to an embodiment of the invention. FIG. 3 is a schematic diagram of an adjusted writing track according to an embodiment of the invention. Referring to FIG. 1 to FIG. 3, the electronic device 100 may execute the flowing steps to automatically adjust the writing track in a writing operation. In step S210, the whiteboard module 110 may perform the writing operation. The user may operate the input module 120 to operate the floating board 111 to generate an operation command. In one embodiment of the invention, the input module 120 may further include a keyboard. The user may also directly operate the keyboard to generate the operation command. Thus, the whiteboard module 110 may execute a write adjustment mode of the writing operation according to the operation command, so as to adjust the writing track according to the operation of the input module 120 controlled by of the user.

In step S220, the whiteboard module 110 may determine whether a writing track of the writing operation is a straight track or a curved track. In particular, the whiteboard module 110 is configured to judge whether at least one of a writing direction and a track angle of the writing track is changed to determine the writing track of the writing operation is the straight track or the curved track. As shown in FIG. 3, the writing track has a start coordinate point K0. The start coordinate point K0 is, for example, the starting point of a mouse click. When neither the writing direction nor the track angle of the writing track is substantially unchanged, the whiteboard module 110 is configured to determine the writing track of the writing operation is the straight track. When the at least one of the writing direction and the track angle of the writing track is changed, the whiteboard module 110 is configured to determine the writing track of the writing operation is the curved track. The whiteboard module 110 may generate a first coordinate point K1 and a second coordinate point K2 corresponding to the writing track according to the writing track. The first coordinate point K1 and the second coordinate point K2 are dynamic coordinate points that change with the writing track. That is, when the at least one of the writing direction and the track angle of the writing track is changed by the user, the first coordinate point K1 and the second coordinate point K2 are also changed accordingly. The first coordinate point K1 and the second coordinate point K2 are auxiliary points used to adjust the writing track and may not be displayed on the cloud electronic whiteboard.

In the embodiment of the invention, when the first coordinate point K1 overlaps the second coordinate point K2, the whiteboard module 110 may determine the writing track of the writing operation is the straight track. When the first coordinate point K1 does not overlap the second coordinate point K2, the whiteboard module 110 may determine the writing track of the writing operation is the curved track. In one embodiment of the invention, the second coordinate point K2 may be an end coordinate point K0' of the writing track, and the whiteboard module 110 may determine the first coordinate point K1 according to the at least one of the writing direction and the track angle of the writing track between the start coordinate point K0 and the second coordinate point K2. The end coordinate point K0' is, for example, the position of the mouse click. When neither the writing direction nor the track angle of the writing track between the start coordinate point K0 and the second coordinate point K2 is changed, the first coordinate point K1 overlaps the second coordinate point K2. When the at least one of the writing direction and the track angle of the writing track between the start coordinate point K0 and the second coordinate point K2 is changed, the first coordinate point K1 does not overlap the second coordinate point K2. Thus, the whiteboard module 110 may determine whether the first coordinate point K1 overlaps the second coordinate point K2 to determine the writing track of the writing operation is the straight track or the curved track.

In step S230, the whiteboard module 110 may adjust the writing track to an adjusted writing track C1 according to a corresponding parametric curve. In the embodiment of the invention, when the whiteboard module 110 determines that the writing track of the writing operation is the straight track, the whiteboard module 110 may automatically adjust the writing track according to a first-order Bezier curve (Linear Bezier curve). The whiteboard module 110 may adjust the writing track between the start coordinate point K0 and the end coordinate point K0' to the straight track. The whiteboard module 110 may dynamically calculate the first-order Bezier curve, so that the adjusted writing track C1 may tend to a perfect straight line. As shown in FIG. 3, when the whiteboard module 110 determines that the writing track of the writing operation is the curved track, the whiteboard module 110 may automatically adjust the writing track according to a second-order Bezier curve (Quadratic Bezier curves). The whiteboard module 110 may adjust the writing track between the start coordinate point K0 and the end coordinate point K0' to the curved track. The whiteboard module 110 may dynamically calculate the second-order Bezier curve, so that the adjusted writing track C1 may tend to a perfect curve. That is, the adjusted writing track C1 is determined by the start coordinate point K0, and the first coordinate point K1 and the second coordinate point K2. The end coordinate point K0' may be determined by the user. In one embodiment of the invention, the end coordinate point K0' may be adjusted by a coordinate point Ka and a coordinate point Kb. When the first coordinate point K1 and the second coordinate point K2 have been defined, the coordinate point Ka moves from the start coordinate point K0 to the first coordinate point K1, and the coordinate point Kb moves from the first coordinate point K1 to the second coordinate point K2, thus the adjusted writing track C1 is determined by the start coordinate point K0 and the dynamic moving end coordinate point K0'. The coordinate point Ka and the coordinate point Kb are auxiliary points used to adjust the writing track and may not be displayed on the cloud electronic whiteboard. In addition, in one embodiment of the invention, when the whiteboard module 110 determines that the writing track of the writing operation is a three-dimensional curved track, the whiteboard module 110 may also automatically adjust the writing track according to a three-order Bezier curve (Cubic Bezier curve).

Specifically, when the whiteboard module 110 determines that the writing track of the writing operation is the curved track, which means the first coordinate point K1 does not overlap the second coordinate point K2. The whiteboard module 110 may adjust the writing track according to a following equation (1). The following equation (1) may be a function B(t) of the second-order Bezier curve. In the equation (1), the symbol t is a parameter, and the symbols $P_0$, $P_1$ and $P_2$ are coordinate parameters. The symbol $P_0$ may correspond to the start coordinate point K0. The symbol $P_1$ may correspond to the first coordinate point K1. The symbol $P_2$ may correspond to the second coordinate point K2.

$$B(t)=(1-t)^2 P_0 + 2t(1-t) P_1 + t^2 P_2, t \in [0,1] \tag{1}$$

In one embodiment of the invention, when the whiteboard module 110 determines that the writing track of the writing operation is the straight track, which means the first coordinate point K1 overlaps the second coordinate point K2. The whiteboard module 110 may adjust the writing track according to a following equation (2). The following equation (2) may be a function B(t) of the first-order Bezier curve. In the equation (2), the symbol t is a parameter, and the symbols $P_0$ and $P_1$ are coordinate parameters. The symbol $P_0$ may correspond to the start coordinate point K0. Due to the first coordinate point K1 overlapping the second coordinate point K2, the symbol $P_1$ may correspond to the first coordinate point K1 and the second coordinate point K2.

$$B(t)=(1-t)P_0 + tP_1, t \in [0,1] \tag{2}$$

In step S240, the whiteboard module 110 may generate a writing message according to the adjusted writing track C1. The electronic device 100 may display and transmit the writing message of the adjusted writing track C1 to the cloud server 200 (i.e. the above-mentioned edit information), so that the cloud server 200 may show the adjusted writing track C1 on the cloud electronic whiteboard. Therefore, the operation method of the embodiment may automatically adjust the writing track to display the writing content with smooth writing effect on the cloud electronic whiteboard. Moreover, the user may quickly and conveniently operate the electronic device 100 to activate the above-mentioned write adjustment mode of the write operation by operating the floating board 111.

In one embodiment of the invention, the above-mentioned write adjustment mode of the write operation may be also activated by, for example, a button of the mouse (such as right mouse button), a button of the keyboard or the stylus.

Figure 4:
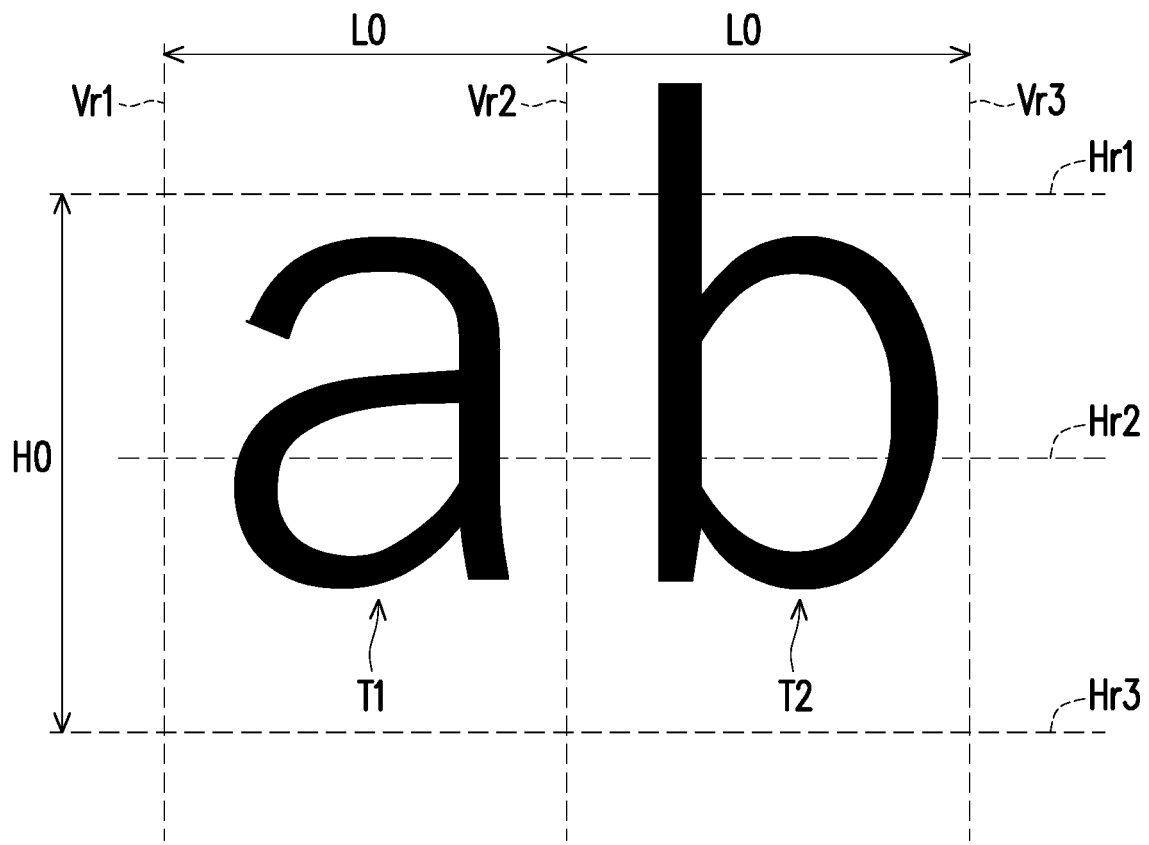
FIG. 4 is a schematic diagram of writing format suggestion information according to an embodiment of the invention.

FIG. 4 is a schematic diagram of writing format suggestion information according to an embodiment of the invention. Referring to FIG. 1 and FIG. 4, in the embodiment of the invention, the whiteboard module 110 may further have a writing format suggestion function. The whiteboard module 110 may generate writing format suggestion information for a current text object according to a size of a pervious text object. For example, as shown in FIG. 4, when the user previously operate the input module 120 to write a text object T1 on the cloud electronic whiteboard, the whiteboard module 110 may analyze the size of the text object T1 to calculate the height H0 and width L0 of the text object T1, so as to generate the writing format suggestion information when the user writes a next text object T2. As shown in FIG. 4, the writing format suggestion information may include horizontal reference lines Hr1 to Hr3 and vertical reference lines Vr1 to Vr3 to form the writing format suggestion for the next text object T2. In one embodiment of the invention, the writing format suggestion information may also be other suggestion patterns or other guide patterns.

In one embodiment of the invention, the text object T1 and the text object T2 are formed by at least one writing track. The writing track may be straight track or curved track. The at least one writing track of the text object T1 and the text object T2 may also be adjusted by the above-mentioned write adjustment mode of the writing operation in the writing processes of the text object T1 and the text object T2, respectively. Thus, the whiteboard module 110 may further display the text object T1 and the text object T2 with smooth writing effect on the cloud electronic whiteboard.

Figure 5:
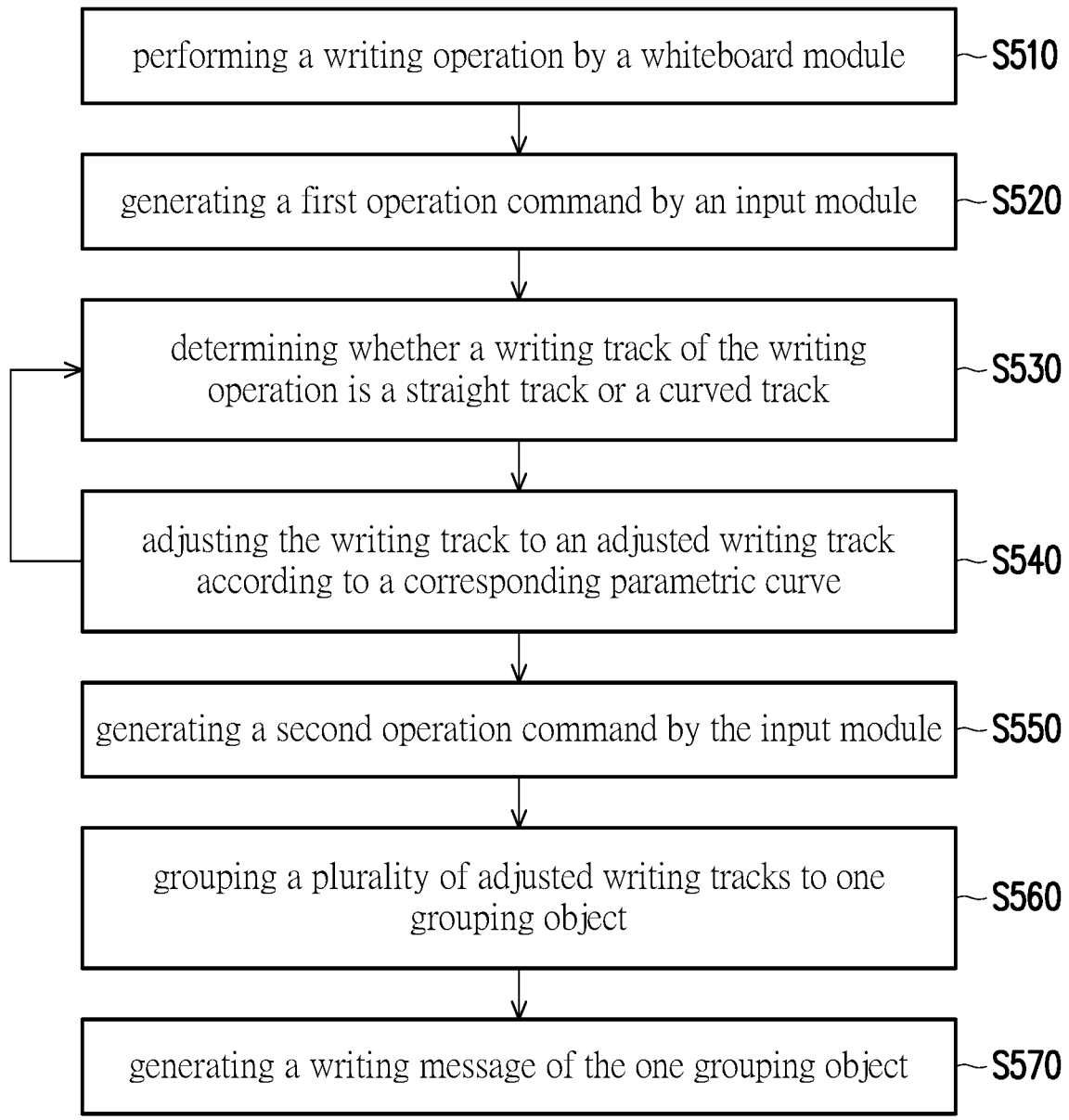
FIG. 5 is a flowchart of an operation method of the electronic whiteboard system according to another embodiment of the invention.
Figure 6:
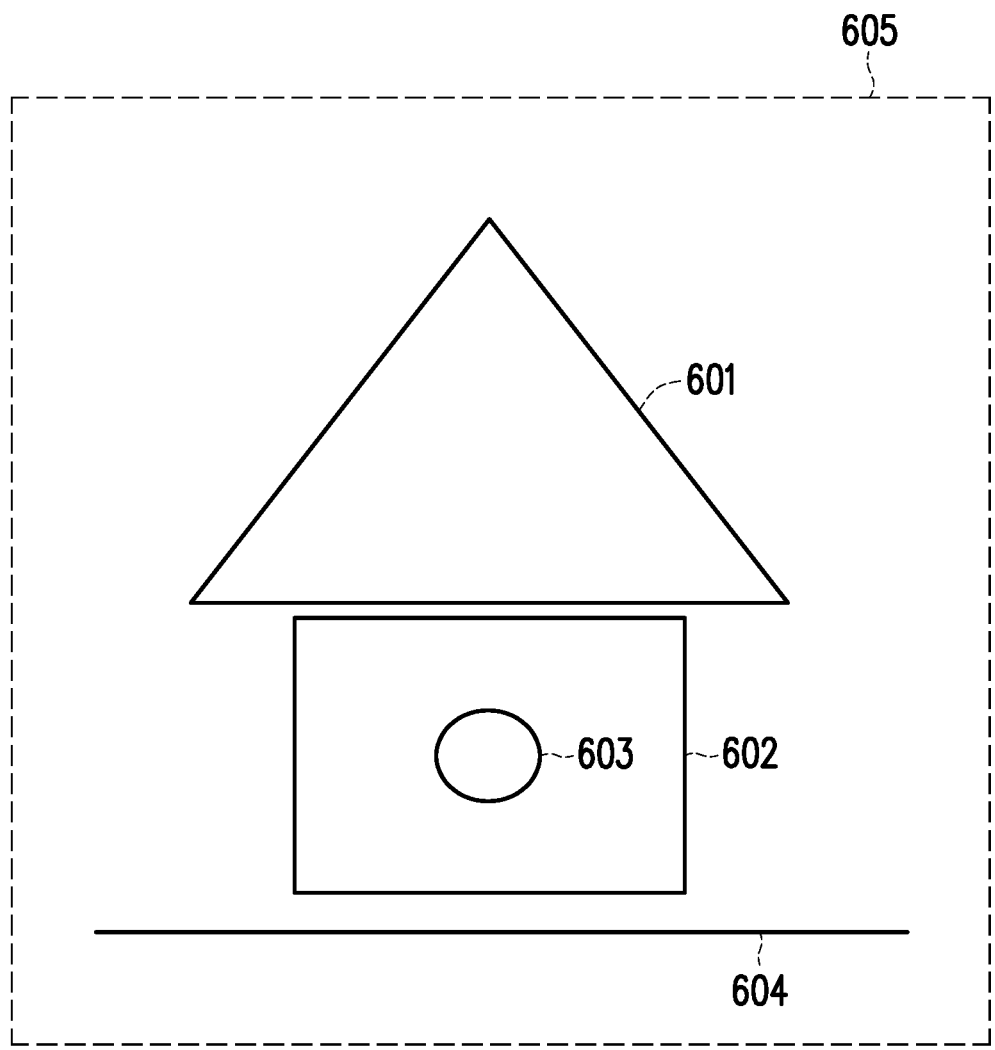
FIG. 6 is a schematic diagram of an operation of a track grouping mode according to an embodiment of the invention.

FIG. 5 is a flowchart of an operation method of the electronic whiteboard system according to another embodiment of the invention. FIG. 6 is a schematic diagram of an operation of a track grouping mode according to an embodiment of the invention. Referring to FIG. 1, FIG. 5 and FIG. 6, in the embodiment of the invention, the electronic whiteboard system 10 may simultaneously operate the above-mentioned write adjustment mode and a track grouping mode of the writing operation. As shown in FIG. 5 and FIG. 6, the whiteboard module 110 may execute the following steps S510 to S570 to adjust a plurality of writing tracks 601 to 604 and group the writing tracks 601 to 604 to one grouping object 605 in the track grouping mode of the writing operation according to a first operation command, and generate a writing message of the one grouping object 605. The writing tracks 601 to 604 correspond to different writing actions. However, the writing tracks of the present embodiment are not limited as the writing tracks 601 to 604 of FIG. 6. In one embodiment of the invention, the writing tracks may respectively have at least one of different writing start points and different writing end points. In one embodiment of the invention, the grouping objects may be, for example, patterns, lines, characters, etc. displayed on the cloud electronic whiteboard, which are not limited by the present invention.

In step S510, the whiteboard module 110 may perform the writing operation. In step S520, the input module 120 may generate a first operation command to the whiteboard module 110. In the embodiment of the invention, the input module 120 may include at least one of a keyboard, a button of a mouse and a stylus. The user may operate the input module 120 by, for example, the button of the mouse or the button of the keyboard to generate the first operation command to the whiteboard module 110. Thus, the whiteboard module 110 may execute the track grouping mode of the writing operation according to the first operation command.

Then, the whiteboard module 110 may execute the write adjustment mode. In step S530, the whiteboard module 110 may determine whether the writing track of the writing operation is a straight track or a curved track. In step S540, the whiteboard module 110 may adjust the writing track to an adjusted writing track according to a corresponding parametric curve. For example, when the user writes to generate the writing track 601, the whiteboard module 110 may automatically adjust the writing track 601. Then, when the user writes to generate the writing track 602, the whiteboard module 110 may also automatically adjust the writing track 602. By analogy, the whiteboard module 110 may sequentially adjust the writing tracks 601 to 604. In the embodiment, the detailed technical content of the write adjustment mode may refer the above-mentioned embodiments, so it is not repeated here.

In one embodiment of the invention, the whiteboard module 110 may execute the write adjustment mode according to a third operation command before the step S530, and the whiteboard module 110 may finish the write adjustment mode according to a fourth operation command after step S540. The third operation command and the fourth operation command may generated by the floating board 111, the button of the mouse, the button of the keyboard, or the stylus operated by the user. In other embodiments of the invention, the write adjustment mode may also be initiated prior to the track grouping mode (before the step S520), or may also be finished after the track grouping mode has finished (after the step S550). Moreover, the write adjustment mode may also be executed continuously to cover multiple operations of the track grouping mode.

In step S550, after the writing tracks 601 to 604 corresponding to the grouping object are done, the input module 120 may generate a second operation command to the whiteboard module 110. The user may operate the input module 120 by, for example, the button of the mouse or the button of the keyboard to generate the second operation command to the whiteboard module 110. Thus, the whiteboard module 110 may finish the track grouping mode of the writing operation according to the second operation command. In step S560, the whiteboard module 110 may group the writing tracks 601 to 604 to one grouping object 605. In step S570, the whiteboard module 110 may generate a writing message of the one grouping object 605. Therefore, the whiteboard module 110 may combine the writing tracks into a text object, which is used for subsequent processing (object recognition, object transfer, etc.). In the embodiment, the one grouping object may correspond to one pattern of one text object or one graphic object.

Due to the writing tracks 601 to 604 just generate one object identification (one message has one object identification), a message amount of the writing message of the one grouping object 605 is less than a total message amount of the writing messages of the plurality of writing tracks 601 to 604. Therefore, the whiteboard module 110 may send the writing message of the one grouping object 605 with less message amount to the cloud server 200, so as to effectively save communication transmission resources, improve the message transmission speed and reduce the amount of data transmission between the pluralities of electronic devices. Moreover, due to the write adjustment mode and the track grouping mode may be quickly executed by the operation commands generated by the floating board 111, the button of the mouse, the button of the keyboard, or the stylus operated by the user (the user only needs to perform simple operation actions), the whiteboard module 110 may realize the fast switching effect of the write adjustment mode and the track grouping mode.

In one embodiment of the invention, after the whiteboard module 110 executes the write adjustment mode and/or the track grouping mode, the user may draw lines or write texts (i.e. words or characters) through the mouse without pressing the button (such as left mouse button), the text quality displayed on the cloud electronic whiteboard is uniform, the text looks like handwritten text, the lines are curved and arcs, and the text is automatically grouped.

In one embodiment of the invention, the whiteboard module 110 may group the writing tracks 601 to 604 to one grouping object 605 by selecting multiple the writing tracks 601 to 604 with the mouse or stylus. That is, the operation command of the track grouping mode may also be generated after the writing tracks 601 to 604 are done.

In one embodiment of the invention, the whiteboard module 110 may also have the writing format suggestion function as shown in FIG. 4. The whiteboard module 110 may group the adjusted writing tracks of the text object T1 to one grouping object. The whiteboard module 110 may generate the writing format suggestion information when the user writes a next text object T2, and the whiteboard module 110 may group the adjusted writing tracks of the text object T2 to one grouping object. Therefore, the adjusted writing tracks of the writing message displayed on the cloud electronic whiteboard are smooth. The text objects of the writing message displayed on the cloud electronic whiteboard are neat and the sizes of the text objects are same or similar. The message amount of the writing message is less.

In summary, the electronic whiteboard system and the operation method thereof of the invention may execute the write adjustment mode in the writing operation to generate the adjusted writing track with smooth writing effect on the cloud electronic whiteboard. In some embodiment of the invention, the electronic whiteboard system may also execute the track grouping mode in the writing operation to group the writing tracks to generate one grouping object, so as to effectively save the message amount of the writing message. Besides, the electronic whiteboard system may generate the writing format suggestion for the text object, so that users can write neatly.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents. Moreover, any embodiment of or the claims of the invention is unnecessary to implement all advantages or features disclosed by the invention. In addition, the abstract and the name of the invention are only used to assist patent searching, and are not used to limit a claim range of the invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electronic whiteboard system for collaboration, comprising:
    a plurality of electronic devices configured to communicatively connect with internet, wherein each of the plurality of electronic devices comprises a processor and a display device,
    wherein the processor of each of the plurality of electronic devices is configured to respectively execute programs for performing a cloud electronic whiteboard, and the display device of each of the plurality of electronic devices is configured to display the same cloud electronic whiteboard,
    wherein the display device of at least one of the plurality of electronic devices is configured to display, on the same cloud electronic whiteboard, a first writing track of a writing operation generated by a mouse or a stylus,
    wherein the processor of the at least one of the plurality of electronic devices is configured to adjust the first writing track to an adjusted writing track according to a corresponding parametric curve,
    wherein the adjusted writing track is different from the first writing track, and
    wherein the display device of each of the plurality of electronic devices is configured to display the same adjusted writing track on the same cloud electronic whiteboard,
    wherein the processor of the at least one of the plurality of electronic devices is further configured to provide horizontal reference lines and vertical reference lines according to a size of the first writing track before a second writing track is written next to the first writing track.

2. The electronic whiteboard system according to claim 1, wherein the processor of the at least one of the plurality of electronic devices is configured to determine whether the first writing track of the writing operation is a straight track or a curved track, and judge whether at least one of a writing direction and a track angle of the first writing track is changed to determine the first writing track of the writing operation is the straight track or the curved track.

3. The electronic whiteboard system according to claim 2, wherein when the processor of the at least one of the plurality of electronic devices is configured to determine that the first writing track of the writing operation is the straight track, the processor of the at least one of the plurality of electronic devices is configured to adjust the first writing track according to a first-order Bezier curve.

4. The electronic whiteboard system according to claim 2, wherein when the processor of the at least one of the plurality of electronic devices is configured to determine that the first writing track of the writing operation is the curved track, the processor of the at least one of the plurality of electronic devices is configured to adjust the first writing track according to a second-order Bezier curve.

5. The electronic whiteboard system according to claim 4, wherein the processor of the at least one of the plurality of electronic devices is configured to generate a first coordinate point and a second coordinate point corresponding to the first writing track,
    wherein the adjusted writing track is determined by a start coordinate point, the first coordinate point and the second coordinate point.

6. The electronic whiteboard system according to claim 1, wherein the processor of the at least one of the plurality of electronic devices is configured to execute a write adjustment mode of the writing operation according to an operation command, so as to determine whether to adjust the first writing track.

7. The electronic whiteboard system according to claim 6, wherein the processor of the at least one of the plurality of electronic devices is configured to execute a floating board to activate the write adjustment mode.

8. The electronic whiteboard system according to claim 1, further comprising:
    a cloud server, communicatively connecting with the plurality of electronic devices, wherein the processor of the at least one of the plurality of electronic devices is configured to generate a writing message according to the adjusted writing track and transmit the writing message to the cloud server.

9. A collaborating operation method of an electronic whiteboard system, the electronic whiteboard system comprising a plurality of electronic devices, each of the plurality of electronic devices comprising a processor and a display device, the collaborating operation method comprising:
    communicatively connecting the plurality of electronic devices with internet;
    performing a cloud electronic whiteboard by executing programs and algorithms by processors of the plurality of electronic devices, respectively;
    displaying the same cloud electronic whiteboard by the display device of each of the plurality of electronic devices;
    generating, by a mouse or a stylus, a first writing track of a writing operation performed by the processor of the at least one of the plurality of electronic device;
    displaying the first writing track of the writing operation on the same cloud electronic whiteboard by the display device of the at least one of the plurality of electronic devices;

adjusting the first writing track to an adjusted writing track according to a corresponding parametric curve by the processor of the at least one of the plurality of electronic devices; and displaying the same adjusted writing track on the same cloud electronic whiteboard by the display device of each of the plurality of electronic devices; and providing horizontal reference lines and vertical reference lines according to a size of the first writing track before a second writing track is written next to the first writing track.

10. The collaborating operation method according to claim 9, further comprising:

determining whether the first writing track of the writing operation is a straight track or a curved track by the processor of the at least one of the plurality of electronic devices; and judging whether at least one of a writing direction and a track angle of the first writing track is changed to determine the first writing track of the writing operation is the straight track or the curved track.

11. The collaborating operation method according to claim 10, further comprising:

adjusting the first writing track according to a first-order Bezier curve when the processor of the at least one of the plurality of electronic devices is configured to determine that the first writing track of the writing operation is the straight track.

12. The collaborating operation method according to claim 10, further comprising:

adjusting the first writing track according to a second-order Bezier curve when the processor of the at least one of the plurality of electronic devices is configured to determine that the first writing track of the writing operation is the curved track.

13. The collaborating operation method according to claim 12, further comprising:

generating a first coordinate point and a second coordinate point corresponding to the first writing track, wherein the adjusted writing track is determined by a start coordinate point, the first coordinate point and the second coordinate point.

14. The collaborating operation method according to claim 9, further comprising:

executing a write adjustment mode of the writing operation according to an operation command, so as to determine whether to adjust the first writing track.

15. The collaborating operation method according to claim 9, further comprising:

communicatively connecting between a cloud server and the plurality of electronic devices;

generating a writing message according to the adjusted writing track; and transmitting the writing message to the cloud server.

* * * * *